United States Patent
Kabalnov et al.

(10) Patent No.: US 9,798,259 B2
(45) Date of Patent: Oct. 24, 2017

(54) ELECTROSTATIC INK COMPOSITIONS, METHODS AND PRINT SUBSTRATES

(71) Applicant: HEWLETT-PACKARD DEVELOPMENT COMPANY, L.P., Houston, TX (US)

(72) Inventors: Alexey S. Kabalnov, San Diego, CA (US); Guang Jin Li, San Diego, CA (US); Brian E. Curcio, San Diego, CA (US); Yaron Grinwald, Meitar (IL); Reut Avigdor, Modiin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 14/652,749

(22) PCT Filed: Jan. 29, 2013

(86) PCT No.: PCT/US2013/023598
§ 371 (c)(1),
(2) Date: Jun. 16, 2015

(87) PCT Pub. No.: WO2014/120119
PCT Pub. Date: Aug. 7, 2014

(65) Prior Publication Data
US 2015/0323879 A1    Nov. 12, 2015

(51) Int. Cl.
*G03G 9/09* (2006.01)
*G03G 9/08* (2006.01)
(Continued)

(52) U.S. Cl.
CPC ......... *G03G 9/0902* (2013.01); *C09D 11/037* (2013.01); *C09D 11/106* (2013.01);
(Continued)

(58) Field of Classification Search
CPC ...... G03G 9/12; G03G 9/1355; G03G 9/0804; G03G 13/10; C09D 11/02; Y10T 428/24901
See application file for complete search history.

(56) References Cited

U.S. PATENT DOCUMENTS

| 4,668,570 A | 5/1987 | Esselborn et al. |
| 5,252,429 A | 10/1993 | Grubb |

(Continued)

FOREIGN PATENT DOCUMENTS

| JP | 2000248218 | 9/2000 |
| JP | 2001072907 | 3/2001 |

(Continued)

OTHER PUBLICATIONS

The Extended European Search Report for International Application No. PCT/US2013/023598 dated Aug. 17, 2016, 7 pages.

*Primary Examiner* — Betelhem Shewareged
(74) *Attorney, Agent, or Firm* — HP Inc. Patent Department (57) ABSTRACT

Described herein is an electrostatic ink composition comprising a liquid carrier; and chargeable particles comprising a co-polymer of an alkylene monomer and an acrylic acid monomer, and a pearlescent, non-metallic pigment, wherein the chargeable particles are dispersed in the liquid carrier. Also described herein are a method of electrophotographic printing and a print substrate.

13 Claims, 1 Drawing Sheet

(51) Int. Cl.

| | | |
|---|---|---|
| *G03G 9/135* | (2006.01) | |
| *G03G 13/10* | (2006.01) | |
| *G03G 9/12* | (2006.01) | |
| *C09D 11/037* | (2014.01) | |
| *C09D 11/106* | (2014.01) | |
| *C09D 11/52* | (2014.01) | |

(52) U.S. Cl.
CPC ........... *C09D 11/52* (2013.01); *G03G 9/0804* (2013.01); *G03G 9/12* (2013.01); *G03G 9/1355* (2013.01); *G03G 13/10* (2013.01); *Y10T 428/24901* (2015.01)

(56) References Cited

U.S. PATENT DOCUMENTS

| | | |
|---|---|---|
| 5,622,780 A | 4/1997 | Paleari |
| 5,994,016 A | 11/1999 | Kuramoto et al. |
| 6,497,998 B1 | 12/2002 | Dontula et al. |
| 7,312,916 B2 | 12/2007 | Pullen et al. |
| 7,326,507 B2 | 2/2008 | Schulze-Hagenest et al. |
| 2009/0111040 A1* | 4/2009 | Veregin .............. G03G 9/08755 430/108.3 |
| 2012/0187346 A1 | 7/2012 | Chun et al. |
| 2012/0196222 A1 | 8/2012 | Chun et al. |
| 2012/0202021 A1 | 8/2012 | Schulze-Hagenest et al. |
| 2013/0323636 A1* | 12/2013 | Bar-Haim ............. G03G 9/122 430/108.23 |

FOREIGN PATENT DOCUMENTS

| | | |
|---|---|---|
| WO | WO 2007130069 | 11/2007 |
| WO | WO 2008013522 | 1/2008 |
| WO | WO-2012/105951 | 8/2012 |
| WO | WO 2012134457 | 10/2012 |

* cited by examiner

ELECTROSTATIC INK COMPOSITIONS, METHODS AND PRINT SUBSTRATES

Electrostatic printing processes typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, by being first transferred to an intermediate transfer member, which can be a soft swelling blanket, and then to the print substrate. Variations of this method utilize different ways for forming the electrostatic latent image on a photoreceptor or on a dielectric material.

DETAILED DESCRIPTION

Before examples of the present invention is disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid," "carrier," or "carrier vehicle" refers to the fluid in which the polymers, particles, colorant, charge directors and/or other additives can be dispersed to form a liquid electrostatic ink or electrophotographic ink. Carrier liquids can include a mixture of a variety of different agents, such as surfactants, co-solvents, viscosity modifiers, and/or other possible ingredients.

As used herein, "electrostatic ink composition" generally refers to an ink composition that is typically suitable for use in an electrostatic printing process, sometimes termed an electrophotographic printing process. It may comprise chargeable particles, which may comprise a thermoplastic resin.

As used herein, "copolymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate either directly, or indirectly via an intermediate transfer member, to a print substrate. As such, the image is not substantially absorbed into the photo imaging substrate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrostatic ink composition to an electric field, e.g. an electric field having a field gradient of 1000 V/cm or more, or in some examples 1500 V/cm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition comprising
 a liquid carrier; and
 chargeable particles comprising a co-polymer of an alkylene monomer and an acrylic acid monomer, and a pearlescent, non-metallic pigment;
 wherein the chargeable particles are dispersed in the liquid carrier.

In an aspect, there is provided a method of electrophotographic printing an electrostatic ink composition, wherein the ink composition comprises
a liquid carrier; and
chargeable particles comprising a co-polymer of an alkylene monomer and an acrylic acid monomer, and a pearlescent, non-metallic pigment; wherein the chargeable particles are dispersed in the liquid carrier,
the method comprising:
forming a latent electrostatic image on a surface;
contacting the surface with the electrostatic ink composition, such that at least some of the chargeable particles adhere to the surface to form a developed toner image on the surface, and transferring the toner image to a print substrate.

In an aspect, there is provided a print substrate having printed thereon an ink comprising a co-polymer of an alkylene monomer and an acrylic acid monomer, and a pearlescent, non-metallic pigment.

The present inventors sought a way of producing an electrostatic ink composition that, when printed, has a metallic appearance. They wished to avoid or mitigate some of the effects observed while printing with some electrostatic ink compositions containing metallic pigments, particularly undesired discharge when the ink is in a high electric field.

Pigments

The pearlescent, non-metallic pigment, in any of the aspects herein, may have any three-dimensional shape. In some examples, the pearlescent, non-metallic pigment is in the form selected from a flake, a sphere, a rod, or approximations thereof. In the present application, a flake may be a shape with a first dimension, which may be termed a thickness, less than the other two dimensions, which may be perpendicular to the first dimension and each other. In some examples, the flake has a thickness of at least 0.01 µm, in some examples a thickness of at least 0.05 µm, in some examples a thickness of at least 0.05 µm, in some examples a thickness of at least 0.1 µm, in some examples a thickness of at least 0.15 µm, in some examples a thickness of at least 0.2 µm, in some examples a thickness of at least 0.4 µm, in some examples a thickness of at least 0.5 µm. In some examples, the flake has a thickness of 5 µm or less, in some examples a thickness of 4 µm or less, in some examples a thickness of 3 µm or less, in some examples a thickness of 1 µm or less, in some examples a thickness of 0.5 µm or less, in some examples a thickness of 0.01 µm or less.

In some examples, the flake has a diameter, measured in a direction perpendicular to the thickness and excluding any coating on the flake, of at least 1 µm, in some examples a diameter of at least 2 µm, in some examples a diameter of at least 3 µm, in some examples a diameter of at least 4 µm, in some examples a diameter of at least 5 µm, in some examples a diameter of at least 6 µm, in some examples a diameter of at least 7 µm, in some examples a diameter of at least 8 µm, in some examples a diameter of at least 10 µm, in some examples a diameter of at least 20 µm, in some examples a diameter of at least 30 µm, in some examples a diameter of at least 35 µm, in some examples a diameter of at least 40 µm. In some examples, the flake has a diameter, measured in a direction perpendicular to the thickness, of 100 µm or less, in some examples a diameter of 70 µm or less, in some examples a diameter of 50 µm or less, in some examples a diameter of 40 µm or less, in some examples a diameter of 30 µm or less, in some examples a diameter of 20 µm or less, in some examples a diameter of 15 µm or less. In some examples, the flake has a diameter, measured in a direction perpendicular to the thickness and excluding any coating on the flake, of from 1 µm to 100 µm, in some examples from 1 µm to 50 µm, in some examples from 1 µm to 30 µm, in some examples from 1 µm to 20 µm, in some examples from 1 µm to 10 µm, in some examples from 10 µm to 50 µm, in some examples from 20 µm to 50 µm, in some examples from 30 µm to 50 µm, in some examples from 40 µm to 50 µm.

In some examples, the pearlescent, non-metallic pigment, excluding any coating thereon, has an aspect ratio of a diameter (measured in a direction perpendicular to the thickness) to its thickness of n:1, where n is at least 2, in some examples at least 5, in some examples at least 10, in some examples at least 20, in some examples at least 30, in some examples at least 35. In some examples, the pearlescent, non-metallic pigment has an aspect ratio of a diameter (measured in a direction perpendicular to the thickness) to its thickness of n:1, where n is 100 or less, in some examples n is 80 or less, in some examples n is 70 or less, in some examples n is 60 or less, in some examples n is 50 or less.

The weight:weight ratio of pearlescent, non-metallic pigment to the total amount of resin in the electrostatic ink composition may be about 1:10 to about 1:1, in some examples about 1:5 to about 1:2, in some examples about 1:4 to about 1:3; the resin will typically include the co-polymer of an alkylene monomer and an acrylic acid monomer. In some examples, the w/w ratio of the co-polymer of an alkylene monomer and an acrylic acid monomer to the pearlescent, non-metallic pigment is from 10:1 to 1:1. In some examples, the w/w ratio of the co-polymer of an alkylene monomer and an acrylic acid monomer to the pearlescent, non-metallic pigment is from 5:1 to 2:1; in some examples about 1:4 to about 1:3.

In some examples, the pearlescent, non-metallic pigment comprises a material, which may be in a form mentioned above, selected from mica, bismuth oxychloride, natural pearl essence, guanine and hypoxanthane purines. In some examples, the pearlescent, non-metallic pigment comprises flakes comprising mica. In some examples, the pearlescent, non-metallic pigment comprises flakes comprising a material selected from mica having on one or more surfaces thereof a high refractive index metal compound. In some examples, the pearlescent, non-metallic pigment comprises flakes comprising a material selected from mica having on one or more surfaces thereof a metal oxide, which may be selected from a transition metal oxide, including, but not limited to, titanium oxide and iron oxides. The one or more surfaces may be opposing surfaces of the flakes.

The pearlescent particles, in the absence of any coating, may have a refractive index of 2 or more.

Pearlescent non-metallic pigments are available, for example those available form BASF, such as Magnapearl 3000 and Magnapearl 4000, Mearlin Card Silver and Mearlin Card Gold.

Resin

The chargeable particles may comprise a resin comprising the co-polymer of an alkylene monomer and an acrylic acid monomer. The chargeable particles may comprise a resin comprising a plurality of types of co-polymer of an alkylene monomer and an acrylic acid monomer. In some examples, the resin, e.g. the co-polymer of an alkylene monomer and an acrylic acid monomer, comprises a polymer having acidic side groups. In some examples, the acrylic acid monomer is selected from acrylic acid and methacrylic acid. The alkylene monomer may, for example, be selected from ethylene and propylene. The alkylene monomer may constitute from 99 wt % to 75 wt % of the polymer, with the monomer selected from acrylic acid and methacrylic acid constituting at least some of, and in some examples all of, the remaining wt %.

The resin, e.g. the co-polymer of an alkylene monomer and an acrylic acid monomer, can include or be, but is not limited to, a thermoplastic polymer. In some examples, the co-polymer of an alkylene monomer and an acrylic acid monomer may be selected from ethylene or propylene acrylic acid copolymers; ethylene or propylene methacrylic acid copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); ethylene ethyl acrylate; ethylene-acrylate terpolymers; ethylene-acrylic esters-maleic anhydride (MAH) or glycidyl methacrylate (GMA) terpolymers; ethylene-acrylic acid ionomers and combinations thereof.

The chargeable particles, may further comprises a resin selected from ethylene vinyl acetate copolymers; polyethylene; polystyrene; isotactic polypropylene (crystalline); polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is in some examples from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)).

As described herein, the co-polymer of an alkylene monomer and an acrylic acid monomer may comprise or be a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin, e.g. the co-polymer of an alkylene monomer and an acrylic acid monomer, may comprise or be a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The co-polymer of an alkylene monomer and an acrylic acid monomer can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The co-polymer of an alkylene monomer and an acrylic acid monomer can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups, at least one of which is a co-polymer of an alkylene monomer and an acrylic acid monomer, and in some examples both may be two different co-polymers of an alkylene monomer and an acrylic acid monomer. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g. First and/or second polymers may each be a co-polymer of an alkylene monomer and an acrylic acid monomer.

The chargeable particles or resin may comprise two different polymers, e.g. at least one of which may be a co-polymer of an alkylene monomer and an acrylic acid monomer or both are different co-polymers of an alkylene monomer and an acrylic acid monomer, having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The chargeable particles may comprise two different polymers, e.g. co-polymers of an alkylene monomer and an acrylic acid monomer, having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The chargeable particles may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

The chargeable particles may comprise two different polymers, e.g. co-polymers of an alkylene monomer and an acrylic acid monomer, having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) in some examples having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), in some examples having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the examples mentioned above, the w/w ratio of the first polymer having acidic side groups to the second polymer having acidic side groups can be from about 10:1 to about 2:1. In another example, the ratio can be from about 6:1 to about 3:1, in some examples about 4:1.

The chargeable particles or the resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein and/or a co-polymer of an alkylene monomer and an acrylic acid monomer. The chargeable particles or resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less, and, in some examples, at least one of, in some examples both of, the first and second polymer is the co-polymer of an alkylene monomer and an acrylic acid monomer. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples of 10000 poise or less, in some examples 1000 poise or less, in some examples 100 poise or less, in some examples 50 poise or less, in some examples 10 poise or less, and in some examples, at least one of, in some examples two or three of, the first, second and third polymers is or are the co-polymer of an alkylene monomer and an acrylic acid monomer; an example of the first polymer is Nucrel 960 (from DuPont), and example of the second polymer is Nucrel 699 (from DuPont), and an example of the third polymer is AC-5120 (from Honeywell). Any or all of the first, second and third polymers may be a co-polymer of an alkylene monomer and an acrylic acid monomer. The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If chargeable particles comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The chargeable particles may comprise a polymer having acidic side groups, as described above (which may be free of ester side groups), and a polymer having ester side groups, wherein either of or both of the polymer having acidic side groups, as described above (which may be free of ester side groups), and, in some examples, the polymer having ester side groups may be a co-polymer of an alkylene monomer and an acrylic acid monomer. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E.I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

In an example, the resin constitutes about 5 to 90%, in some examples about 5 to 70%, by weight of the solids of the electrostatic ink composition. In another example, the resin constitutes about 10 to 60% by weight of the solids of the electrostatic ink composition. In another example, the resin constitutes about 15 to 40% by weight of the solids of the electrostatic ink composition. In another example, the resin constitutes about 60 to 95% by weight, in some examples from 70 to 90% by weight, in some examples 75 to 85% by weight of the solids of the electrostatic ink composition.

Charge Director and Charge Adjuvants

The electrostatic ink composition may include a charge director. The method as described here may involve adding a charge director at any stage. The charge director may be added to impart a charge of positive or negative polarity on the resin-coated pearlescent, non-metallic pigment particles and/or maintain sufficient electrostatic charge on the resin-coated pearlescent, non-metallic pigment particles. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the resin-coated pearlescent, non-metallic pigment particles. In some examples, the charge director imparts a positive charge on the resin-coated pearlescent, non-metallic pigment particles.

In some examples, the charge director comprises a sulfosuccinate moiety of the general formula [$R_1$—O—C(O)

CH$_2$CH(SO$_3^-$)C(O)—O—R$_{2'}$], where each of R$_{1'}$ and R$_{2'}$ is an alkyl group. In some examples, the charge director comprises nanoparticles of a simple salt and a sulfosuccinate salt of the general formula MA$_n$, wherein M is a metal, n is the valence of M, and A is an ion of the general formula [R$_{1'}$—O—C(O)CH$_2$CH(SO$_3^-$)C(O)—O—R$_{2'}$], where each of R$_{1'}$ and R$_{2'}$ is an alkyl group, or other charge directors as found in WO2007130069, which is incorporation herein by reference in its entirety. As described in WO2007130069, the sulfosuccinate salt of the general formula MA$_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 200 nm or less, in some examples 2 nm or more. As described in WO2007130069, simple salts are salts that do not form micelles by themselves, although they may form a core for micelles with a micelle forming salt. The ions constructing the simple salts are all hydrophilic. The simple salt may comprise a cation selected from Mg, Ca, Ba, NH$_4$, tert-butyl ammonium, Li$^+$, and Al$^{+3}$, or from any sub-group thereof. The simple salt may comprise an anion selected from SO$_4^{2-}$, PO$^{3-}$, NO$_3^-$, HPO$_4^{2-}$, CO$_3^{2-}$, acetate, trifluoroacetate (TFA), Cl$^-$, Bf, F$^-$, ClO$_4^-$, and TiO$_3^{4-}$, or from any sub-group thereof. The simple salt may be selected from CaCO$_3$, Ba$_2$TiO$_3$, Al$_2$(SO$_4$), Al (NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. The charge director may further comprise basic barium petronate (BBP).

In the formula [R$_{1'}$—O—C(O)CH$_2$CH(SO$_3^-$)C(O)—O—R$_{2'}$], in some examples, each of R$_{1'}$ and R$_{2'}$ is an aliphatic alkyl group. In some examples, each of R$_{1'}$ and R$_{2'}$ independently is a C$_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, R$_{1'}$ and R$_{2'}$ are the same. In some examples, at least one of R$_{1'}$ and R$_{2'}$ is C$_{13}$H$_{27}$. In some examples, M is Na, K, Cs, Ca, or Ba. The formula [R$_{1'}$—O—C(O)CH$_2$CH(SO$_3^-$)C(O)—O—R$_{2'}$] and/or the formula MA$_n$ may be as defined in any part of WO2007130069.

The charge director may comprise (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01 to 20% by weight, in some examples 0.01 to 10% by weight, in some examples 0.01 to 1% by weight of the solids of the electrostatic ink composition. In some examples, the charge director constitutes about 0.001 to 0.15% by weight of the solids of the electrostatic ink composition, in some examples 0.001 to 0.15%, in some examples 0.001 to 0.02% by weight of the solids of the electrostatic ink composition.

The electrostatic ink composition may include a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethyl-hexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or comprises aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition.

In some examples, the chargeable particles further comprise a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation comprises a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a C$_8$ to C$_{26}$ fatty acid anion, in some examples a C$_{14}$ to C$_{22}$ fatty acid anion, in some examples a C$_{16}$ to C$_{20}$ fatty acid anion, in some examples a C$_{17}$, C$_{18}$ or C$_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

In some examples, the chargeable particles further comprise a salt of multivalent cation and a fatty acid anion and the composition further comprises a charge director selected from metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols. In some examples, the chargeable particles further comprise a salt of multivalent cation and a fatty acid anion and the composition further comprises a charge director selected oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of sulfonic acid. In some examples, the chargeable particles further comprise a salt of multivalent cation and a fatty acid anion and the composition further comprises a charge director selected from a sulfosuccinate moiety of the general formula [$R_{1'}$—O—C(O)CH$_2$CH(SO$_3^-$)C(O)—O—$R_{2'}$], where each of $R_{1'}$ and $R_{2'}$ is an alkyl group, which may be as described above.

The charge adjuvant, which may, for example, be or comprise a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition.

The electrostatic ink composition may comprise an additive or a plurality of additives. The additive or plurality of additives may be added at any stage of the method. The additive or plurality of additives may be selected from a charge director, a charge adjuvant, a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

The present disclosure also relates to a method of electrostatic printing. The present disclosure further provides a method of electrophotographic printing an electrostatic ink composition, wherein the ink composition comprises
 a liquid carrier; and
 chargeable particles comprising a co-polymer of an alkylene monomer and an acrylic acid monomer, and a pearlescent, non-metallic pigment, wherein the chargeable particles are dispersed in the liquid carrier,
the method comprising:
forming a latent electrostatic image on a surface;
contacting the surface with the electrostatic ink composition, such that at least some of the chargeable particles adhere to the surface to form a developed toner image on the surface, and transferring the toner image to a print substrate.

Figure 1:
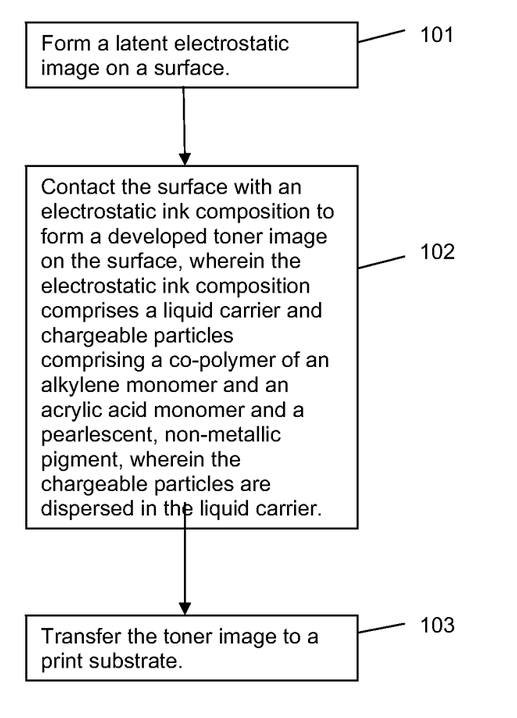
FIG. 1 shows schematically an example of a method of electrophotographic printing an electrostatic ink composition as described herein.

FIG. 1 shows schematically an example of a method of electrostatic printing. Step 101 is to form a latent electrostatic image on a surface. Step 102 is to contact the surface with an electrostatic ink composition to form a developed toner image on the surface, wherein the electrostatic ink composition comprises a liquid carrier and chargeable particles comprising a co-polymer of an alkylene monomer and an acrylic acid monomer and a pearlescent, non-metallic pigment, wherein the chargeable particles are dispersed in the liquid carrier. Step 103 is to transfer the toner image to a print substrate.

In some examples, before being passed to the latent electrostatic image on the surface, the electrostatic ink composition is first passed between an electrode and a developer roller, and in some examples then passed on the developer roller by a squeegee roller, before being transferred to the surface, wherein, in some examples, the electrode voltage is set at from 1600 to 1800 V, the developer roller voltage is set at from 400 to 600 V and the squeegee roller is set at from 800 to 1000 V.

The surface on which the latent electrostatic image is formed may be on a rotating member, e.g. in the form of a cylinder. The surface on which the latent electrostatic image is formed may form part of a photo imaging plate (PIP). The developed toner image may be transferred from the surface to a print substrate (e.g. paper) directly or, by being first transferred to an intermediate transfer member, and then to a print substrate. The intermediate transfer member may be a rotating flexible member, which may be heated, e.g. to a temperature of from 80 to 130° C.

The present disclosure further provides a print substrate having printed thereon an ink comprising a co-polymer of an alkylene monomer and an acrylic acid monomer, and a pearlescent, non-metallic pigment. The print substrate may have been produced in the method of electrophotographic printing described herein. The electrostatic ink composition may further comprise additives, for example a charge adjuvant and/or a charge director. The co-polymer of an alkylene monomer and an acrylic acid monomer, the pearlescent, non-metallic pigment, and if present, the charge adjuvant and/or a charge director, may be as described herein. In some examples, the pearlescent, non-metallic pigment comprises flakes comprising a material selected from mica having on one or more surfaces thereof a high refractive index metal compound.

The print substrate may be any suitable substrate. The substrate may be any suitable substrate capable of having an image printed thereon. The substrate may comprise a material selected from an organic or inorganic material. The material may comprise a natural polymeric material, e.g. cellulose. The material may comprise a synthetic polymeric material, e.g. a polymer formed from alkylene monomers, including, but not limited to, polyethylene and polypropylene, and co-polymers such as styrene-polybutadiene. The polypropylene may be biaxially orientated polypropylene. The material may comprise a metal, which may be in sheet form. The metal may be selected from or made from, for instance, aluminum (Al), silver (Ag), tin (Sn), copper (Cu), mixtures thereof. In some examples, the substrate comprises a cellulosic paper. In some examples, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate may comprise or be a cellulosic print substrate such as paper. The cellulosic print substrate may comprise or be a coated cellulosic print substrate, e.g. having a coating of a polymeric material thereon.

The present disclosure further provides a method of producing an electrostatic ink composition, the method comprising:
 combining a carrier liquid, a co-polymer of an alkylene monomer and an acrylic acid monomer, and a pearlescent, non-metallic pigment, and, in some examples, a charge director and/or a charge adjuvant, such that the electrostatic ink composition, which may be as described herein, is formed. The method can comprise mixing the co-polymer of an alkylene monomer and an acrylic acid monomer, the pearlescent, non-metallic pigment and the carrier liquid under appropriate conditions, in some examples in the presence of a charge adjuvant, to form the particles comprising the co-polymer of an alkylene monomer and an acrylic acid monomer and a pearlescent, non-metallic pigment, and in some examples the charge adjuvant, within the carrier liquid; and, in some examples, then mixing the charge director with the carrier liquid. One or more further additives as described herein may be added at any time during the method. The steps described above are not intended to be bound by any particular order. For example, the mixing of the co-polymer of an alkylene monomer and an acrylic acid monomer with the carrier liquid may be performed before, after, or concurrently with the step of combining the charge director with the carrier liquid. Additionally, the steps may be combined or performed in a different order. Additionally, the steps may include other necessary processing steps as is known in the art. For example, the step of combining the co-polymer of an alkylene monomer and an acrylic acid monomer and the pearlescent, non-metallic pigment can include grinding the co-polymer of an alkylene monomer and an acrylic acid monomer and the pearlescent, non-metallic pigment and, in some examples, a charge adjuvant, in the liquid carrier. This forms particles, each of which contains the co-polymer of an alkylene monomer and an acrylic acid monomer and the pearlescent, non-metallic pigment, and, in some examples, the charge adjuvant. The mixing and/or grinding may involve high shear mixing.

EXAMPLES

The following examples illustrate a number of variations of the present compositions and methods that are presently known to the inventors. However, it is to be understood that the following are only examples of the application of the principles of the present compositions and methods. Numerous modifications and alternative compositions and methods may be devised by those skilled in the art without departing from the spirit and scope of the present compositions and methods. The appended claims are intended to cover such modifications and arrangements. Thus, while the present compositions and methods have been described above with particularity, the following examples provide further detail in connection with what are presently deemed to be acceptable.

In the following examples, the pigments given in Table 1 were used.

TABLE 1

| Pigment | Manufacturer | Chemistry | Particle size (average diameter) |
|---|---|---|---|
| Magnapearl MP3000 | BASF | Mica-Titania | 4 μm |
| Magnapearl MP4000 | BASF | Mica-Titania | 43 μm |

The polymer resin paste used in the examples below contained the resin Nucrel 699, available from Dupont, and the resin A-C 5120, available from Honeywell in the relative weight:weight amounts of 80:20. These resins constitute the solids of the resin paste. The resins in the paste were present in Isopar L liquid in the amounts stated below (e.g. 25 wt % solids, unless otherwise stated). In the following, this polymer blend is called F1-Ace resin paste.

Example 1A—the General Encapsulation Process (Magnapearl MP3000)

400 g of the resin paste (at 25% solids), 4 g of Aluminum Tristearate and 25 g of Magnapearl MP3000 pigment were low-shear mixed together at 40±2° C. and 60 rpm for 20 hours with an IKA Eurostar 20 overhead stirrer equipped with an R1342 four-bladed propeller mixer. 100 g of Isopar L was added to facilitate mixing. The resulting mixture was then high-shear mixed for 1 hour with an IKA T50 Ultra-Turrex homogenizer, at increasing speed, starting at 2000 rpm, and rising to 4000 rpm within the first 5 minutes. There was no temperature control during mixing, but the temperature was between 40° C. and 50° C., because of heat given off during the mixing process. The mixture was then low-shear mixed again at 40±2° C. and 60 rpm for 20 hours. The following day, the mixture was high-shear mixed again as described above. The final % solids in the paste was 22.6%. Finally, the ink was diluted to 2% NVS in imaging oil (Isopar L) and charged to 80 pmho low field conductivity by adding a charge director (the commercially available HP Imaging Agent, available from Hewlett-Packard), before testing. Low field conductivity is measured at an electric field amplitude of 20 5 V/mm, an ac frequency of 5 Hz, and at a temperature of 23° C.

Examples 1B and 1C

The method used in Example 1A was repeated for Examples 1B and 1C, except that the amounts of component were those given in Table 2.

TABLE 2

| Component | Example 1B | Example 1C |
|---|---|---|
| F1-Ace resin paste | 400 g | 400 g |
| Magnapearl MP3000 | 33 g | 50 g |
| Aluminum Tristearate | 4 g | 4 g |
| Isopar L | 101 g | 129 g |

Example 2—The Encapsulation Process (Magnapearl MP4000)

The method used in Example 1A was repeated for Example 2, except that Magnapearl MP4000 was used instead of Magnapearl MP3000.

Example 3—Characterization of the Encapsulated Products (SEM)

Scanning Electron Micrographs of the starting pigments, the polymer paste and the product following encapsulation were taken, when the materials had been dried and were in a vacuum. From analysis of the electron micrographs, it was clear that the polymer tends to adhere to flat sides of the pigment plates, forming cylindrical strings of beads of approximately 0.4 μm in diameter.

Example 4—Characterization of the Encapsulated Products (Settling)

The settling rates of the starting pigments, the polymer paste and the product following encapsulation at 2% in Isopar L were measured and are shown in Table 3. The pigment, the polymer blend, and the final ink were diluted to 0.5, 2 and 2% w/w, respectively, in Isopar L. 10 ml of the diluted dispersions were transferred to 20 ml glass vials, with the level of the liquid of 5 cm above the bottom. The dispersions were shaken by hand and the moment of time at which the sediment was formed at the bottom was observed visually, as shown in Table 3.

TABLE 3

| Material | Density (g/cm³) | Density differential (g/cm³) | Sediment at the bottom (mins)** |
|---|---|---|---|
| 0.5% Magnapearl MP3000 pigment | 3.2 | 2.4 | 0.5 |
| 2% F1-Ace polymer | 0.94 | 0.17 | 6 |
| Example 1C ink | 1.09* | 0.33 | 3 |
| Isopar L | 0.77 | — | |

*The value of the density of the ink assumes 100% encapsulation in the polymer, neglects swelling in Isopar L, and assumes additivity of volume.
**Measurement of the sediment at the bottom was in scintillation vials with 5 cm dispersion height.

The settling rate of Magnapearl MP3000 is slowed down in the presence of the F1-Ace polymer, roughly in proportion to the theoretical density differential—indicating at least some degree of encapsulation.

Example 5—Printing of Example Inks

The example inks were then printed on coated offset base media using a HP-Indigo Digital Press 7000 with voltages settings for the various components given in Table 4. The grey boxes represent, of the settings tested, optimal settings, which were used in all the other experiments. The media was an Endurance Digital 12×18" coated offset media available from Xpedx distributor.

TABLE 4

| Electrode Voltage (EV) | Developer Voltage (DRV) | Squeezy Roller Voltage (SQV) | Cleaner Roller Voltage (CLV) |
|---|---|---|---|
| 1659 | 489 | 689 | 289 |
| 1850 | 645 | 1020 | 320 |
| 1659 | 489 | 864 | 164 |
| 1815 | 645 | 1020 | 320 |
| 1170 | 444 | 375 | 325 |

All values given in Table 4 are the magnitudes of the applied potentials in volts. All potentials applied were negative potentials.

Example 6—Flop Index and Optical Density of Encapsulated Products

Table 5 shows the flop index performance of ink made using the method of Example 1A (Magnapearl MP3000) and printed on coated offset base media. The prints were generated by using sequential impressions on the same area of the media, as indicated in the first column of Table 5. Here 100, 200, 300 and 400% correspond to one, two, three and four sequential impressions on the media of an ink of Example 1A.

TABLE 5

| Sample | Measurement Angle | | | Flop Index | OD | Flop index/OD |
|---|---|---|---|---|---|---|
| | 15 | 45 | 110 | | | |
| PANTONE 877 C | 127.1 | 59.67 | 34.36 | 12.2 | 0.507 | 24.1 |
| 100% | 113.31 | 89.05 | 86.9 | 2.1 | 0.103 | 20.4 |
| 200% | 116.15 | 87.44 | 84.04 | 2.7 | 0.126 | 21.4 |
| 300% | 123.29 | 86.49 | 81.6 | 3.6 | 0.147 | 24.5 |
| 400% | 126.27 | 83.16 | 79.58 | 4.3 | 0.187 | 23.0 |

The Flop Index (F.I) is the parameter which indicates metallic appearance. F.I measures the change in reflectance of a metallic color as it is rotated through the range of viewing angles. There are several Flop Index equations, but most are based on the difference between the reflectance near specular and the reflectance far from specular, all divided by the reflectance at an intermediate angle.

The equation for calculating flop index used above is as follows:

$$\text{Flop index} = \frac{2.69(L^*_{15°} - L^*_{110°})^{1.11}}{(L^*_{45°})^{0.86}}$$

OD represents optical density.

Pantone 877C is a commercially available silver metallic ink standard, available from X-Rite Company. The results above compare the F.I and OD of the Pantone with inks described herein. One can see that the metallic sheen of pearlescent ink is softer and not as high as that of the metallic ink standard. However it is combined with a low optical density and the ratio of the flop index to the optical density of pearlescent inks of this disclosure is similar to that of the Pantone 877C standard.

While the compositions, methods and related aspects have been described with reference to certain embodiments, those skilled in the art will appreciate that various modifications, changes, omissions, and substitutions can be made without departing from the spirit of the disclosure. It is intended, therefore, that the compositions, methods and related aspects be limited by the scope of the following claims. Unless otherwise stated, the features of any dependent claim can be combined with the features of any of the other dependent claims.

The invention claimed is:

1. An electrostatic ink composition comprising
a liquid carrier;
chargeable particles comprising
a co-polymer of an alkylene monomer and an acrylic acid monomer, and
a pearlescent, non-metallic pigment;
a charge director; and
a charge adjuvant,
wherein the chargeable particles are dispersed in the liquid carrier,
wherein the pearlescent, non-metallic pigment has an aspect ratio of a diameter measured in a direction perpendicular to the thickness to its thickness of n:1, where n is at least 2 and n is 100 or less, and
wherein the w/w ratio of the copolymer of an alkylene monomer and an acrylic acid monomer to the pearlescent, non-metallic pigment is from 10:1 to 4:1.

2. An electrostatic ink composition according to claim 1, wherein the pearlescent, non-metallic pigment comprises flakes comprising a material selected from mica having on one or more surfaces thereof a high refractive index metal compound.

3. An electrostatic ink composition according to claim 2, wherein the high refractive index metal compound is selected from titanium oxide and an iron oxide.

4. An electrostatic ink composition according to claim 1, wherein the pearlescent, non-metallic pigment comprises flakes having a diameter of from 1 μm to 50 μm.

5. An electrostatic ink composition according to claim 1, wherein the chargeable particles further comprise a salt of multivalent cation and a fatty acid anion.

6. An electrostatic ink composition according to claim 5, wherein the multivalent cation is $Al^{3+}$.

7. An electrostatic ink composition according to claim 5, wherein the composition further comprises a charge director selected from metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, and organic acid esters of polyvalent alcohols.

8. An electrostatic ink composition according to claim 1, wherein the alkylene monomer is selected from ethylene and propylene and the acrylic acid monomer is selected from acrylic acid and methacrylic acid.

9. An electrostatic ink composition according to claim 1, wherein the chargeable particles have been formed by grinding of the co-polymer of an alkylene monomer and an acrylic acid monomer, and the pearlescent, non-metallic pigment in the presence of a salt of multivalent cation and a fatty acid anion.

10. A method of electrophotographic printing an electrostatic ink composition, wherein the ink composition comprises
 a liquid carrier; and
 chargeable particles comprising
  a co-polymer of an alkylene monomer and an acrylic acid monomer, and
  a pearlescent, non-metallic pigment,
  wherein the chargeable particles are dispersed in the liquid carrier,
  wherein the pearlescent, non-metallic pigment has an aspect ratio of a diameter measured in a direction perpendicular to the thickness to its thickness of n:1, where n is at least 2 and n is 100 or less, and
  wherein the w/w ratio of the copolymer of an alkylene monomer and an acrylic acid monomer to the pearlescent, non-metallic pigment is from 10:1 to 4:1;
 a charge director; and
 a charge adjuvant,
 the method comprising:
  forming a latent electrostatic image on a surface;
  contacting the surface with the electrostatic ink composition, such that at least some of the chargeable particles adhere to the surface to form a developed toner image on the surface, and
  transferring the toner image to a print substrate.

11. A method according to claim 10, wherein, before being passed to the latent electrostatic image on the surface, the electrostatic ink composition is first passed between an electrode and a developer roller, then passed on the developer roller by a squeegee roller, before being transferred to the surface, wherein electrode voltage is set at from 1600 to 1800 V, the developer roller voltage is set at from 400 to 600 V and the squeegee roller is set at from 800 to 1000 V.

12. A print substrate having printed thereon an ink comprising
 a co-polymer of an alkylene monomer and an acrylic acid monomer, and
 a pearlescent, non-metallic pigment,
 a charge director, and
 a charge adjuvant,
 wherein the pearlescent, non-metallic pigment has an aspect ratio of a diameter measured in a direction perpendicular to the thickness to its thickness of n:1, where n is at least 2 and n is 100 or less, and
 wherein the w/w ratio of the copolymer of an alkylene monomer and an acrylic acid monomer to the pearlescent, non-metallic pigment is from 10:1 to 4:1.

13. A print substrate according to claim 12, wherein the pearlescent, non-metallic pigment comprises flakes comprising a material selected from mica having on one or more surfaces thereof a high refractive index metal compound.

* * * * *